(12) United States Patent
Sumida

(10) Patent No.: US 11,445,103 B2
(45) Date of Patent: Sep. 13, 2022

(54) IMAGING APPARATUS, FOCUSING ADJUSTMENT APPARATUS, AND METHOD FOR CONTROLLING FOCUSING ADJUSTMENT APPARATUS

(71) Applicant: CANON KABUSHIKI KAISHA, Tokyo (JP)

(72) Inventor: Noa Sumida, Narashino (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 16/854,675

(22) Filed: Apr. 21, 2020

(65) Prior Publication Data
US 2020/0344404 A1 Oct. 29, 2020

(30) Foreign Application Priority Data
Apr. 26, 2019 (JP) .............................. JP2019-086265

(51) Int. Cl.
*H04N 5/232* (2006.01)
*G02B 7/28* (2021.01)

(52) U.S. Cl.
CPC ........... *H04N 5/23212* (2013.01); *G02B 7/28* (2013.01)

(58) Field of Classification Search
CPC .................................................. H04N 5/23212

USPC ........................................................ 348/345
See application file for complete search history.

(56) References Cited

U.S. PATENT DOCUMENTS

2019/0094656 A1* 3/2019 Shibata ............ H04N 5/232122

FOREIGN PATENT DOCUMENTS

| JP | 2000-147369 A | 5/2000 |
| JP | 2016-27696 A | 2/2016 |
| JP | 2018-136360 A | 8/2018 |

* cited by examiner

*Primary Examiner* — Joel W Fosselman
(74) *Attorney, Agent, or Firm* — Canon U.S.A., Inc. IP Division

(57) ABSTRACT

A method is provided for controlling an apparatus for performing control to, move, in a case where a detected defocus amount is within a range of a second in-focus management width, a focusing lens and then terminate a focusing adjustment operation without performing focus detection processing again, and move, in a case where the defocus amount is out of the range of the second in-focus management width, the focusing lens to perform the focus detection processing again. In a case where a subject to be subjected to the focus detection processing is a saturated subject, at least one of the range of the second in-focus management width and the focus detection operation is changed.

17 Claims, 16 Drawing Sheets

FIG.2A

PIXEL CONFIGURATION WITH NON-IMAGING PLANE PHASE DIFFERENCE METHOD

| R  | Gr | R  | Gr | R  | Gr | R  | Gr | R  | Gr |
|----|----|----|----|----|----|----|----|----|----|
| Gb | B  | Gb | B  | Gb | B  | Gb | B  | Gb | B  |

FIG.2B

PIXEL CONFIGURATION WITH IMAGING PLANE PHASE DIFFERENCE METHOD

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

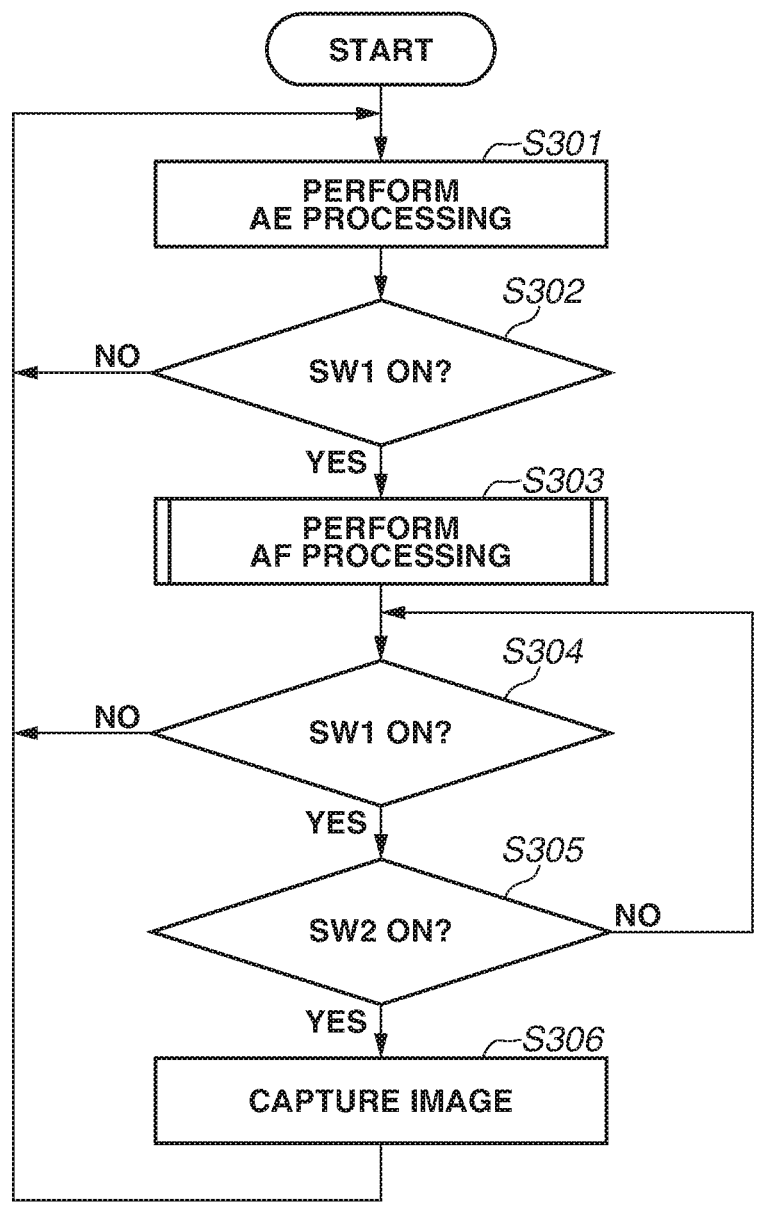

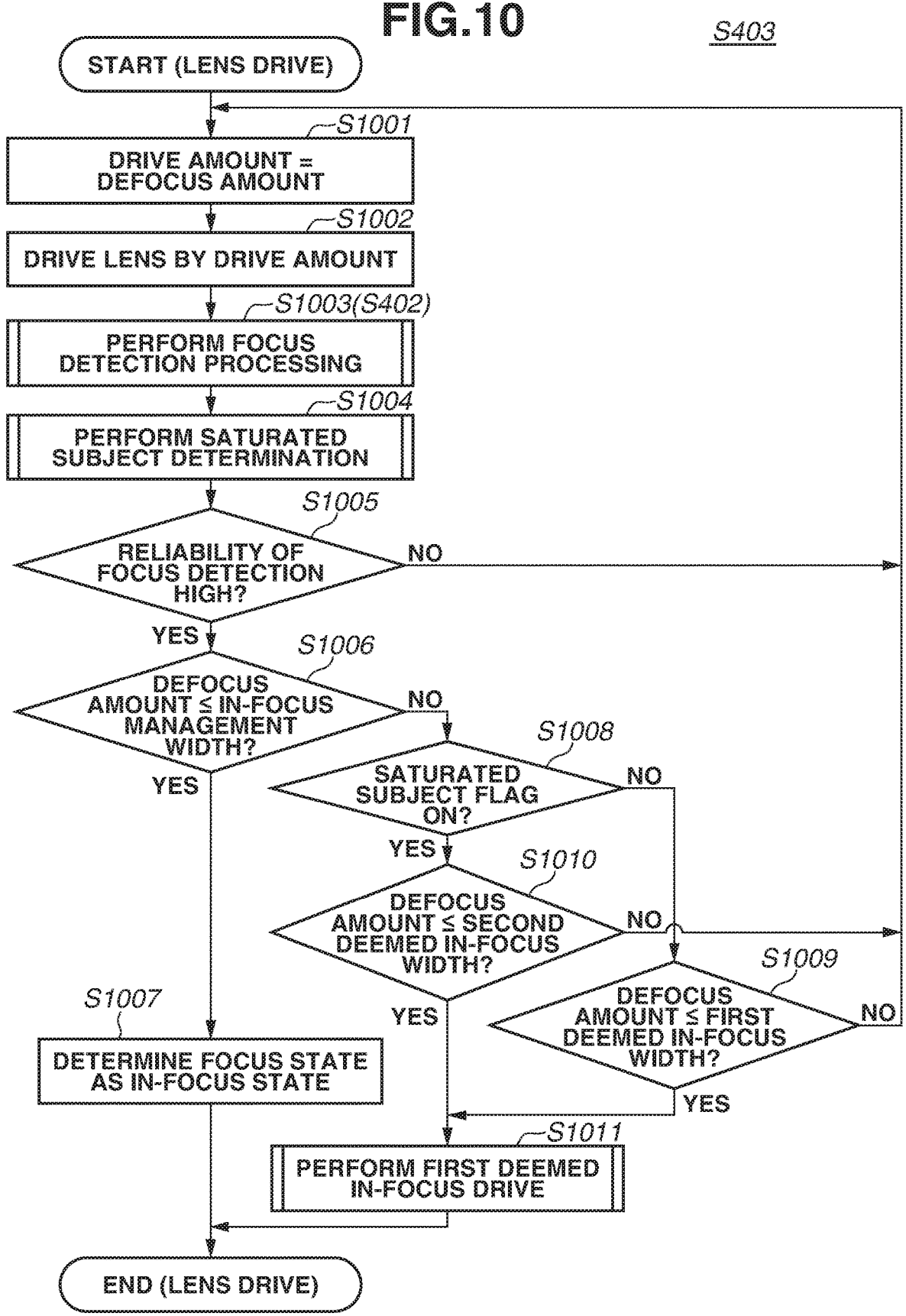

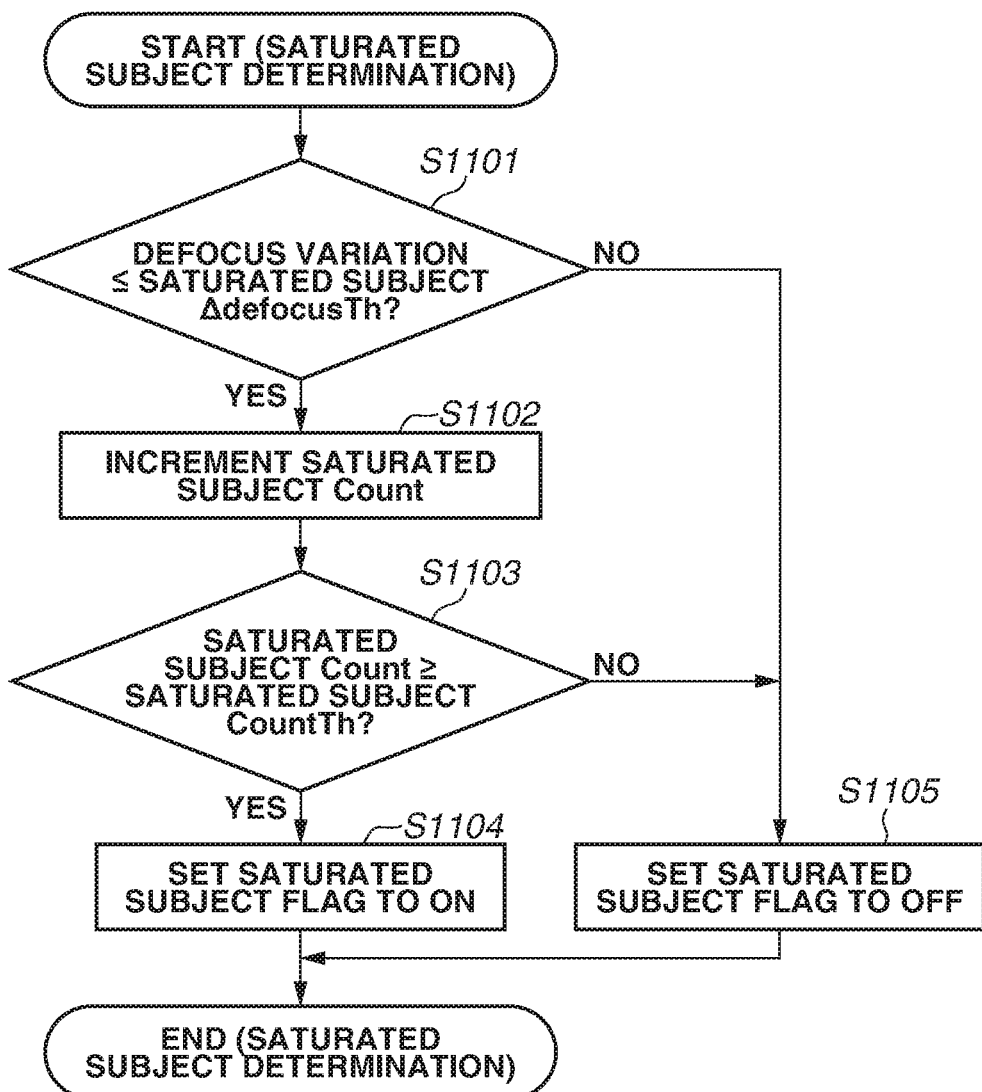

IMAGING APPARATUS, FOCUSING ADJUSTMENT APPARATUS, AND METHOD FOR CONTROLLING FOCUSING ADJUSTMENT APPARATUS

BACKGROUND OF THE INVENTION

Field of the Invention

The aspect of the embodiments relates to an apparatus having a focusing adjustment function and a method for controlling the apparatus.

Description of the Related Art

In a focusing operation of a camera, in a case where a defocus amount detected in focus detection falls within a range of a predetermined in-focus determination width (deemed in-focus determination width), control may be performed to terminate focusing control without performing focus detection again after completion of lens drive. Setting such a deemed in-focus determination width enables reduction in the occurrence of a lens hunting phenomenon.

Japanese Patent Application Laid-Open No. 2018-136360 discusses a technique for improving the focusing accuracy by increasing the in-focus determination width (deemed in-focus determination width) for a subject having a low luminance level at which a defocus amount is likely to vary.

However, the prior art discussed in Japanese Patent Application Laid-Open No. 2018-136360 does not consider measures for a subject having comparatively small variation in the defocus amount. With a saturated subject having a high luminance level, an image signal is likely to have sharp edges at the boundary to the background (dark portion), and variation in the defocus amount tends to be equivalent to that for general subjects. Thus, in performing a focusing operation with a saturated subject as the main subject, it may be impossible to set a deemed in-focus width suitable for the saturated subject. In such a case, defocusing may occur, possibly degrading the focusing accuracy.

The aspect of the embodiments is directed to preventing the focusing accuracy from degrading even in a case where a focusing operation is performed on a saturated subject as the main subject.

SUMMARY OF THE INVENTION

As a technical feature of the aspect of the embodiments, there is provided a method for controlling a focusing adjustment apparatus for performing control to, terminate, in a case where a detected defocus amount is within a range of a first in-focus management width, a focusing adjustment operation without moving a focusing lens, move, in a case where the defocus amount is out of the range of the first in-focus management width, the focusing lens to perform the focusing adjustment operation, move, in a case where the defocus amount is within a range of a second in-focus management width, the focusing lens and then terminate the focusing adjustment operation without performing focus detection processing again, and move, in a case where the defocus amount is out of the range of the second in-focus management width, the focusing lens to perform the focus detection processing again. In a case where a subject to be subjected to the focus detection processing is a saturated subject, at least one of the range of the second in-focus management width and the focus detection operation is changed.

Further features of the disclosure will become apparent from the following description of exemplary embodiments with reference to the attached drawings.

BRIEF DESCRIPTION OF THE DRAWINGS

FIG. 2A illustrates an example of a pixel configuration with a non-imaging plane phase difference method, and FIG. 2B illustrates an example of a pixel configuration with an imaging plane phase difference method.

FIG. 3 is a flowchart illustrating processing of an imaging apparatus.

FIG. 10 is a flowchart illustrating lens drive according to a first exemplary embodiment.

FIG. 11 is a flowchart illustrating saturated subject determination.

DESCRIPTION OF THE EMBODIMENTS

Figure 1:
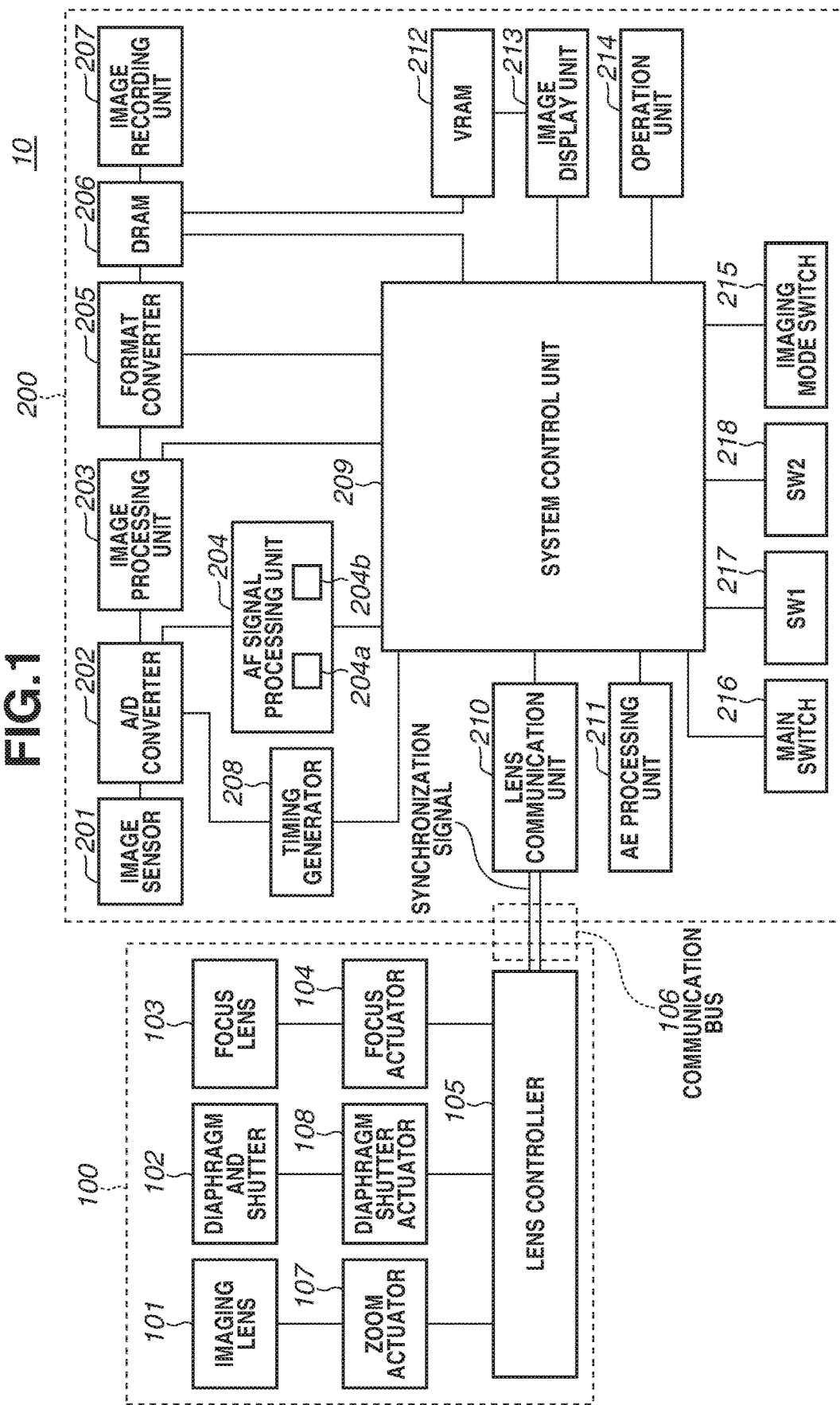
FIG. 1 is a block diagram illustrating a lens-interchangeable camera system.

Exemplary embodiment of the disclosure will be described in detail below with reference to the accompanying drawings.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM).

Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store information. Examples of the processor readable or machine accessible medium that may store include a storage medium, an electronic circuit, a semiconductor memory device, a read only memory (ROM), a flash memory, a Universal Serial Bus (USB) memory stick, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Configuration of Imaging Apparatus

A first exemplary embodiment will be described below centering on a case where the disclosure is applied to a lens-interchangeable imaging apparatus.

The configuration of the imaging apparatus according to the present exemplary embodiment will be described below with reference to FIG. 1. FIG. 1 is a block diagram of a lens-interchangeable camera system 10. The lens-interchangeable camera system 10 includes a camera body 200 (imaging apparatus main body) and a lens apparatus 100 (imaging optical system) which is attachable to and detachable from the camera body 200. The lens apparatus 100 is detachably (interchangeably) attached to the camera body 200 via a mount portion (not illustrated) having an electrical contact unit. The present exemplary embodiment is also applicable to an imaging apparatus integrally formed of a lens apparatus and a camera body.

The lens apparatus 100 includes an imaging lens 101, a diaphragm and shutter 102, a focusing lens 103, a zoom actuator 107, a diaphragm shutter actuator 108, a focus actuator 104, and a lens controller 105. The imaging lens 101 includes a zoom mechanism. The diaphragm and shutter 102 controls the light amount. The focusing lens 103 is used for focusing on the image sensor 201 (described below). The zoom actuator 107 rotates a cam barrel (not illustrated) to move the zoom mechanism included in the imaging lens 101 in the optical axis direction, thus performing a zooming operation. The diaphragm shutter actuator 108 controls the opening diameter of the diaphragm and shutter 102 to adjust the imaging light amount, and performs exposure time control at the time of still image capturing. The focus actuator 104 moves the focusing lens 103 in the optical axis direction to perform a focusing adjustment operation. The lens controller 105 controls the entire lens apparatus 100 to connect with the camera body 200 via a communication bus 106.

The camera body 200 includes the image sensor 201, an analog-to-digital (A/D) converter 202, an image processing unit 203, an automatic focusing (AF) signal processing unit 204, and a format converter 205. The image sensor 201 functions as a light receiving unit (photoelectric conversion elements) for converting reflected light from the subject into an electrical signal. The A/D converter 202 includes a cadmium sulfide (CDS) circuit for removing output noise of the image sensor 201, and a nonlinear amplification circuit for performing nonlinear amplification before analog-to-digital (AD) conversion. According to the present exemplary embodiment, the AF signal processing unit 204 includes an acquisition unit 204a and a calculation unit 204b. The camera body 200 includes a high-speed built-in memory (dynamic random access memory (DRAM)) 206, such as a random access memory (RAM), and uses the memory as a high-speed buffer (temporary image storage unit) or a work memory in image compression and decompression.

The camera body 200 further includes an image recording unit 207, a system control unit 209, a lens communication unit 210, an automatic exposure (AE) processing unit 211, an image display memory (video RAM (VRAM)) 212, and an image display unit 213. The image recording unit 207 includes a recording medium, such as a memory card and the interface. The system control unit 209 controls the system including imaging sequences. The lens communication unit 210 is connected to the lens controller 105 via the communication bus 106 and performs communication between the camera body 200 and the lens apparatus 100. The image display unit 213 displays images, operation assistance information, and camera statuses. At the time of image capturing, the image display unit 213 displays an imaging screen and a focus detection region.

The camera body 200 includes an operation unit 214 for the user to operate the camera body 200. The camera body 200 includes menu switches for performing various settings for imaging functions and image reproduction settings of the lens-interchangeable camera system 10, and an operation mode changeover switch for switching between the imaging mode and the reproduction mode. An imaging mode switch 215 is used for selecting the imaging mode, such as a macro mode and a sports mode. A main switch 216 is used for turning ON power of the camera body 200. A switch (SW1)

217 is used for performing imaging standby operations, such as automatic focusing adjustment (AF) and automatic exposure (AE). A switch (SW2) 218 is used for capturing an image after operating the switch SW1.

An image sensor 201 including a charge coupled device (CCD) sensor or complementary metal oxide semiconductor (CMOS) sensor photoelectrically converts a subject image (optical image) formed through the imaging optical system of the lens apparatus 100 and then outputs a pixel signal (image data). More specifically, a light flux incident from the imaging optical system forms an image on the light receiving surface of the image sensor 201, and is converted into signal charges according to the incident light amount by the pixels (photodiodes) arranged on the image sensor 201. Signal charges accumulated in each photodiode are sequentially read from the image sensor 201 as a voltage signal corresponding to the signal charges based on a drive pulse output from a timing generator 208 according to an instruction of the system control unit 209.

Each pixel of the image sensor 201 according to the present exemplary embodiment includes a pair of two photodiodes A and B, and one micro lens provided for the pair of the photodiodes A and B (each micro lens shares the photodiodes A and B). More specifically, the image sensor 201 includes a plurality of two-dimensionally arranged micro lenses each of which having a pair of photodiodes (a first photoelectric converter and a second photoelectric converter). Each pixel divides incident light by using a micro lens to form a pair of optical images on the pair of the photodiodes A and B and outputs a pair of pixel signals (A image signal and B image signal) used for AF signals (described below) from the pair of the photodiodes A and B. An imaging signal (A+B image signal) can be obtained by adding the outputs of the pair of the photodiodes A and B.

A pair of image signals as the AF signals (signals for focus detection) used for AF based on the imaging plane phase difference detection method (imaging plane phase difference AF) can be obtained by combining the plurality of the A image signals and the plurality of the B image signals output from the plurality of pixels. An AF signal processing unit 204 (described below) performs the correlation calculation for the pair of image signals to calculate a phase difference as a shift amount between the pair of image signals (image shift amount), and further calculates the defocus amount (including the defocusing direction) of the imaging optical system based on the image shift amount.

Thus, the image sensor 201 photoelectrically converts an optical image formed by receiving a light flux that passed the imaging optical system of the lens apparatus 100 into an electrical signal and outputs image data (image signal). The image sensor 201 according to the present exemplary embodiment is provided with two photodiodes for each micro lens, and is able to generate an image signal to be used for focus detection based on the imaging plane phase difference AF method. The number of photodiodes sharing one micro lens can be changed, e.g., four photodiodes may be provided for each micro lens.

FIG. 2A schematically illustrates an example of a pixel configuration not conforming to the imaging plane phase difference AF method. FIG. 2B schematically illustrates an example of a pixel configuration conforming to the imaging plane phase difference AF method. Both the pixel configurations illustrated in FIGS. 2A and 2B use the Bayer array. R denotes a red color filter, B denotes a blue color filter, and Gr and Gb denote green color filters. In the pixel configuration illustrated in FIG. 2B conforming to the imaging plane phase difference AF method, one pixel (drawn with solid lines) in a pixel configuration not conforming to the imaging plane phase difference AF method illustrated in FIG. 2A includes the horizontally divided photodiodes A and B illustrated in FIG. 2B. The photodiodes A and B (the first and the second photoelectric converters) receive light fluxes that have passed different pupil regions in the imaging optical system.

Since the photodiodes A and B receive light fluxes that have passed different exit pupil regions of the imaging optical system in this way, the B image signal has a parallax with respect to the A image signal. One image signal (A or B image signal) out of the above-described imaging signal (A+B image signal) and a pair of parallax image signals has a parallax. The pixel division method illustrated in FIG. 2B is to be considered as an example, and other pixel configurations are also applicable. For example, each pixel may be divided in the vertical direction or divided in each of the horizontal and the vertical directions (i.e., divided into four pieces). The same single image sensor may include a plurality of types of pixels divided by different division methods.

The present exemplary embodiment has been described above centering on a configuration where a plurality of photoelectric converters is disposed for each micro lens, and a pupil-divided light flux is incident to each photoelectric converter. However, the aspect of the embodiments is not limited thereto. For example, in the configuration of a focus detection pixel, one photodiode may be provided under the micro lens, and pupil division may be performed by horizontally or vertically blocking light by using a light shielding layer. A pair of focus detection pixels may be discretely disposed in the array of a plurality of imaging pixels, and a pair of image signals may be acquired from the pair of focus detection pixels.

The imaging signal read from the image sensor 201 and the AF signals are input to the A/D converter 202. The A/D converter 202 subjects the imaging signal and the AF signals to correlated double sampling for removing reset noise, gain adjustment, and digitization. The A/D converter 202 outputs the imaging signal to the image processing unit 203 and outputs the AF signals to the AF signal processing unit 204.

The AF signal processing unit 204 (the acquisition unit 204a) acquires the AF signals (a pair of image signals including a first signal (A image signal) and a second signal (B image signal)) output from the A/D converter 202. The AF signal processing unit 204 (the calculation unit 204b) performs the correlation calculation based on the AF signals to calculate the image shift amount, and calculates the defocus amount based on the image shift amount. The AF signal processing unit 204 (the calculation unit 204b) ranks the reliability based on the reliability information of the AF signals (coincidence of the two images, steepness of the two images, contrast information, saturation information, and defect information). The defocus amount and the reliability information (reliability) calculated by the AF signal processing unit 204 are output to the system control unit 209.

Imaging Processing

Operations of the camera body 200 according to the present exemplary embodiment will be described below with reference to FIG. 3. FIG. 3 is a flowchart illustrating operations of the camera body 200. Each step of the flowchart illustrated in FIG. 3 is executed by each unit based mainly on instructions of the system control unit 209.

In step S301, the system control unit 209 controls the AE processing unit 211 to perform AE processing on the output signal from the image processing unit 203. In step S302, the system control unit 209 determines whether the switch 217 (SW1) is ON. If the switch 217 (SW1) is ON (YES in step S302), the processing proceeds to step S303. If the switch 217 (SW1) is OFF (NO in step S302), the processing returns to step S301.

In step S303, the system control unit 209 performs an AF operation. The AF operation will be described in detail below. In step S304, the system control unit 209 determines whether the switch 217 (SW1) is ON. If the switch 217 (SW1) is ON (YES in step S304), the processing proceeds to step S305. If the switch 217 (SW1) is OFF (NO in step S304), the processing returns to step S301.

In step S305, the system control unit 209 determines whether the switch 218 (SW2) is ON. If the switch 218 (SW2) is OFF (NO in step S305), the processing returns to step S304. If the switch 218 (SW2) is ON (YES in step S305), the processing proceeds to step S306. In step S306, the system control unit 209 performs an imaging operation. Then, the processing returns to step S301.

Details of AF Processing (Step S303)

The AF processing (step S303) according to the present exemplary embodiment will be described below with reference to FIG. 4.

Figure 4:
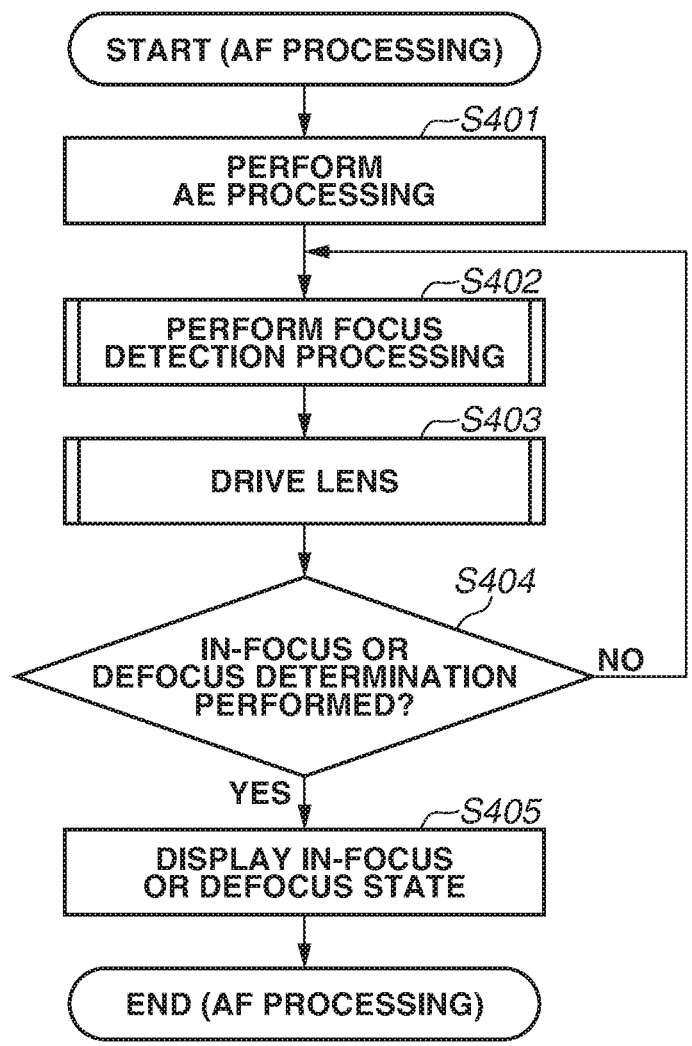
FIG. 4 is a flowchart illustrating automatic focusing (AF) processing.

Each step in the flowchart illustrated in FIG. 4 is executed mainly by the AF signal processing unit 204 and the system control unit 209.

In step S401, the system control unit 209 controls the AE processing unit 211 to perform the AE processing on the output signal of the image processing unit 203. In step S402, the AF signal processing unit 204 performs focus detection processing by using the pair of image signals to calculate the defocus amount and reliability. The focus detection processing will be described in detail below.

In step S403, the system control unit 209 drives (moves) the focusing lens 103 based on the defocus amount and reliability calculated in step S402. Lens drive will be described in detail below.

In step S404, the system control unit 209 determines whether the focus state (in-focus/defocus) is determined. If the focus state is not determined (NO in step S404), the processing returns to step S402. If the focus state is determined (YES in step S404), the processing proceeds to step S405. In step S405, the system control unit 209 displays the in-focus or defocus state. The processing then exits this flowchart.

<Details of Focus Detection Processing (Step S402)>

Figure 5:
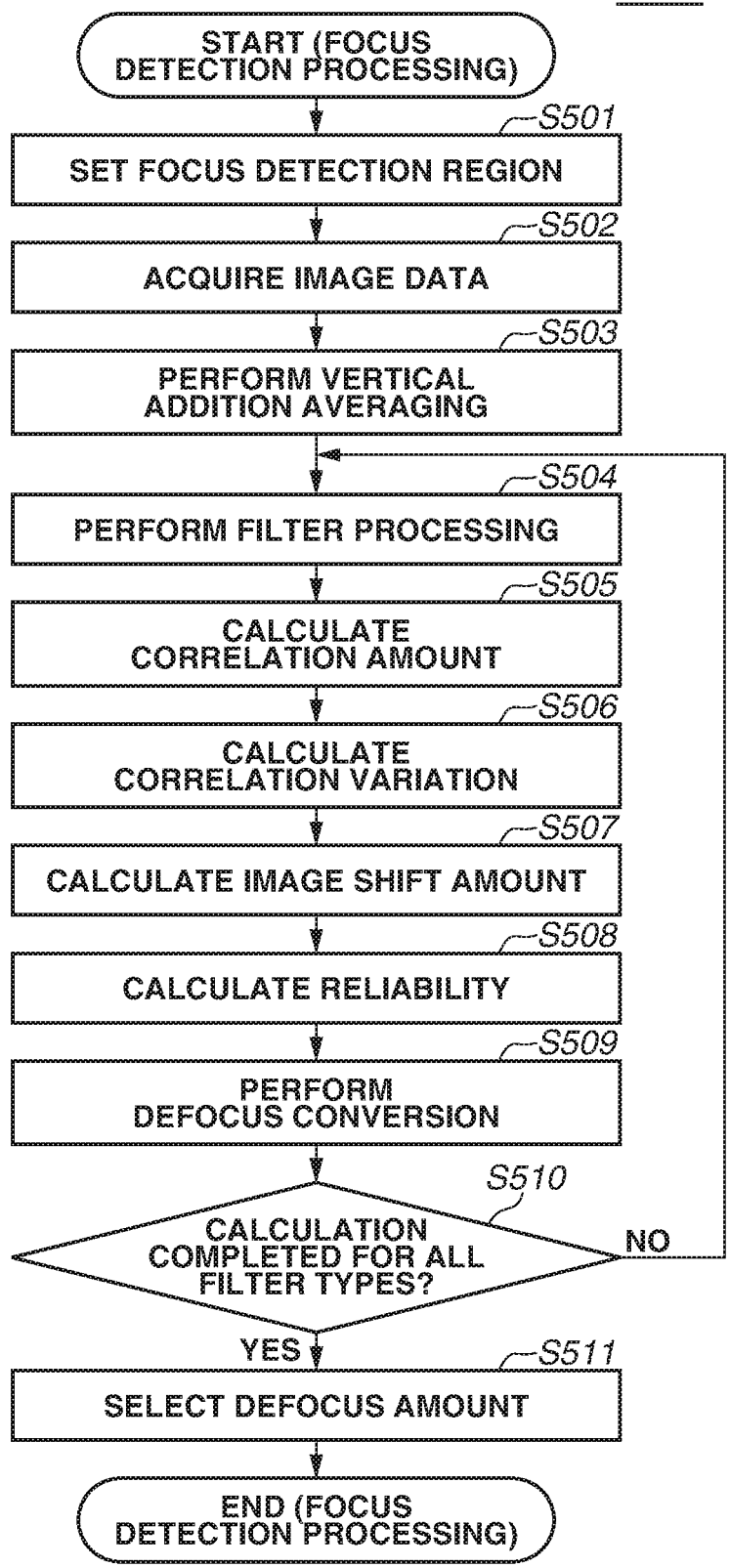
FIG. 5 is a flowchart illustrating focus detection processing.

The focus detection processing (step S402) will be described in detail below with reference to FIG. 5. Each step illustrated in FIG. 5 is executed mainly by the system control unit 209 or by the AF signal processing unit 204 based on an instruction of the system control unit 209.

In step S501, the AF signal processing unit 204 (the system control unit 209) sets a focus detection region over an optional range in the image sensor 201. In step S502, the AF signal processing unit 204 acquires the pair of image signals (A and B image signals) for focus detection from the image sensor 201 for the focus detection region set in step S501. In step S503, the AF signal processing unit 204 performs the line averaging in the vertical direction on the pair of image signals acquired in step S502. The line averaging reduces the effect of noise in the image signals. In step S504, the AF signal processing unit 204 performs the filter processing of extracting signal components in a predetermined frequency band out of the pair of image signals having been subjected to the line averaging in step S503.

In step S505, the AF signal processing unit 204 calculates a correlation amount based on the pair of image signals after the filter processing in step S504. In step S506, the AF signal processing unit 204 calculates correlation variation based on the correlation amount calculated in step S505. In step S507, the AF signal processing unit 204 calculates an image shift amount based on the correlation variation calculated in step S506. In step S508, the AF signal processing unit 204 calculates the reliability of the image shift amount calculated in step S507. In step S509, the AF signal processing unit 204 converts the image shift amount into the defocus amount.

In step S510, the system control unit 209 determines whether the calculation for the filter processing in step S504 is completed for all of filter types. If the filter processing is completed for all of filter types (YES in step S510), the processing proceeds to step S511. If the filter processing is completed not for all of filter types (NO in step S510), the processing returns to step S504. According to the present exemplary embodiment, in the filter processing in step S504, the AF signal processing unit 204 performs, for example, the filter processing by using three different types of frequency band-pass filters (low-pass filter, middle-band-pass filter, and high-pass filter) in the horizontal direction, on the pair of image signals having been subjected to the line averaging. The low-pass, middle-band-pass, and high-pass filters refer to relative frequency values of frequency components extracted by each filter, not absolute frequency values. In step S510, the system control unit 209 determines whether the processing in steps S504 to S509 is completed for all of the three different frequency bands.

In step S511, the system control unit 209 performs the in-focus determination. The in-focus determination refers to processing for selecting the defocus amount calculated by using the filters. More specifically, the system control unit 209 (determination unit) selects (determines) a combination of the defocus amount and reliability out of the three combinations of the defocus amount and reliability calculated in a series of the operations in steps S504 to S509.

Issues of Saturated Subject

Figure 6:
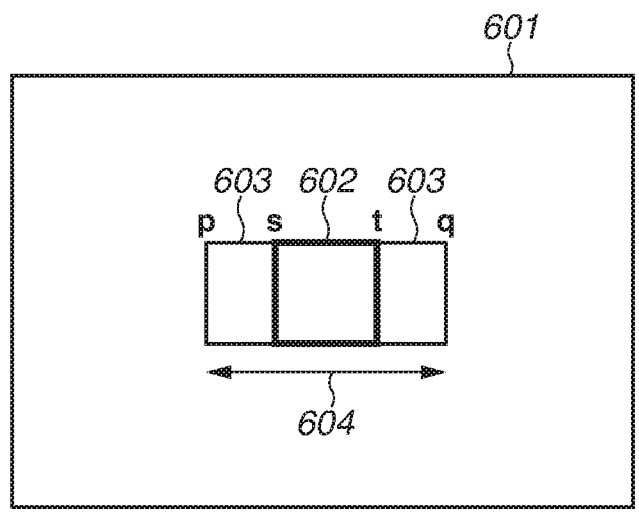
FIG. 6 illustrates a focus detection region.

The focus detection region (AF region) set in step S501 illustrated in FIG. 5 will be described in detail below with reference to FIG. 6. FIG. 6 illustrates a focus detection region 602 on a pixel array 601 of the image sensor 201. Shift regions 603 on both sides of the focus detection region 602 are regions required for the correlation calculation. Thus, a region 604 including the focus detection region 602 and the shift regions 603 is a pixel region required for the correlation calculation. Referring to FIG. 6, p, q, s, and t denote coordinates in the horizontal direction (x-axis direction). p and q denote the x coordinates of the start and the end points of the region 604 (pixel region), respectively. s and t denote the x coordinates of the start and the end points the focus detection region 602, respectively.

Figure 7A:
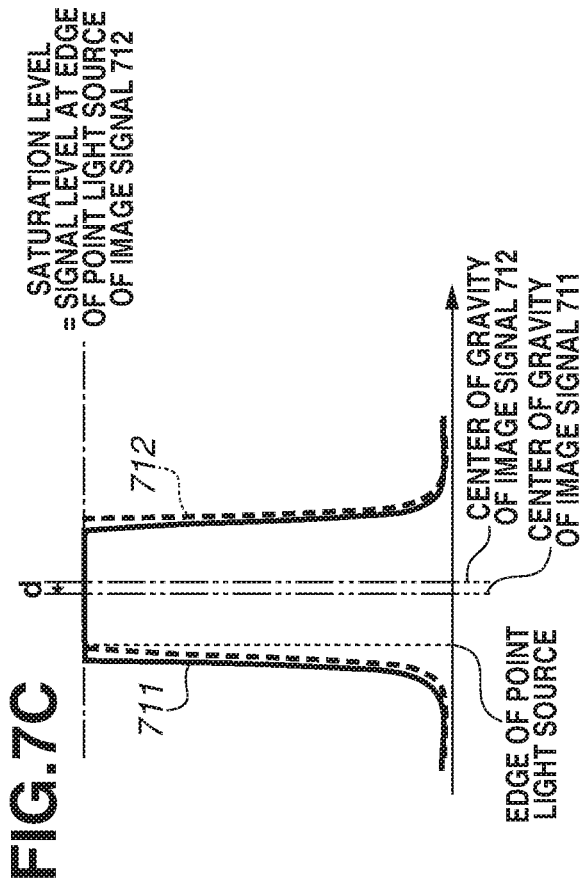
FIGS. 7A, 7B, 7C, and 7D are conceptual views illustrating a difference in AF signals (a pair of image signals) between a case where the focus detection region includes a saturated subject and a case where the focus detection region does not include a saturated subject.
Figure 7C:
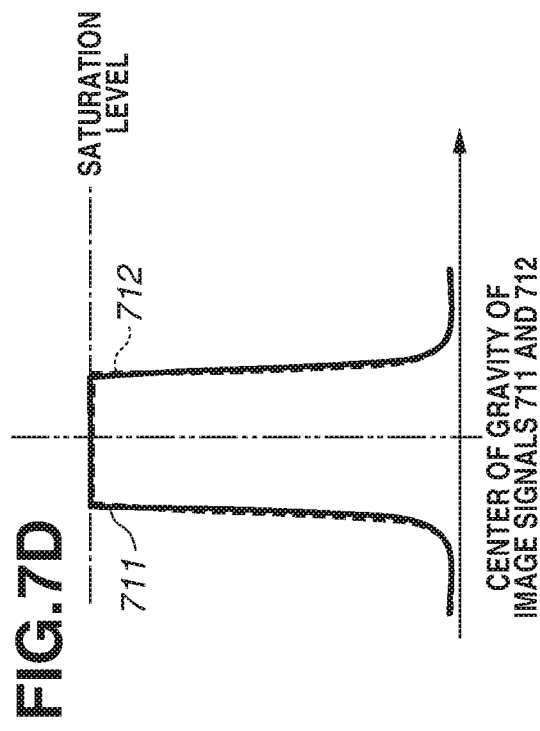
Figure 7B:
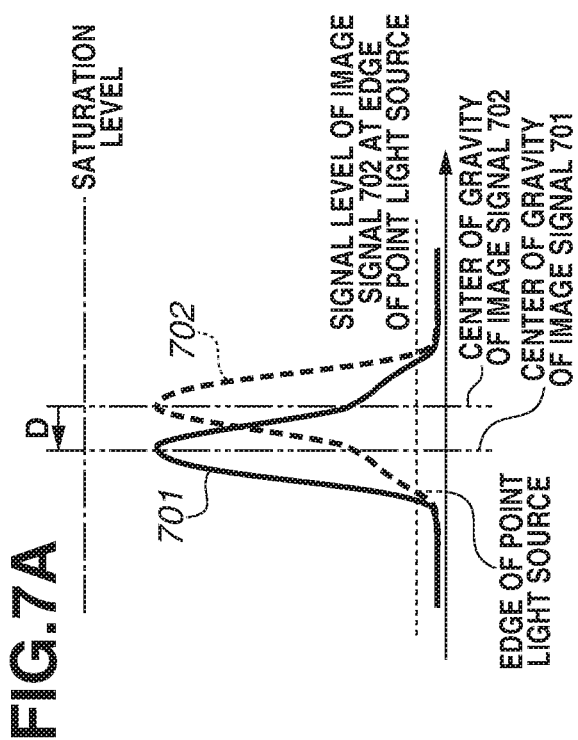
Figure 7D:
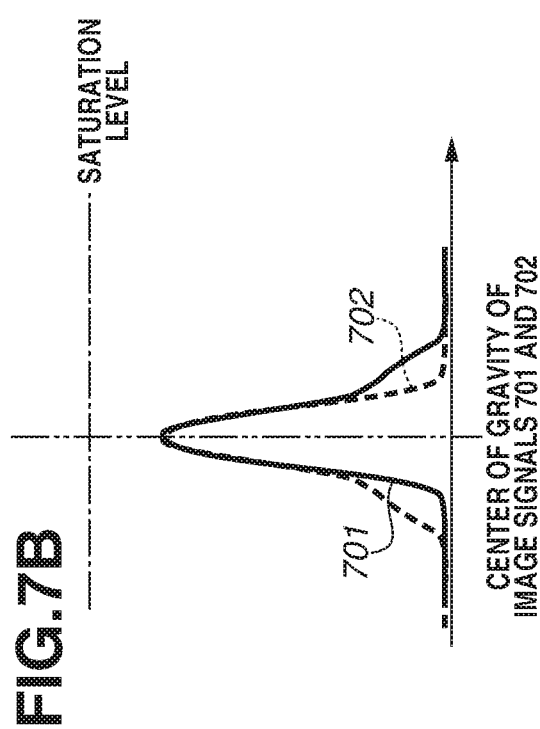

FIGS. 7A, 7B, 7C, and 7D conceptually illustrate differences in AF signals (a pair of image signals) between a case where the focus detection region 602 illustrated in FIG. 6 includes no saturated subject (FIGS. 7A and 7B) and a case where the focus detection region 602 includes a saturated subject (FIGS. 7C and 7D). Referring to each of FIGS. 7A, 7B, 7C, and 7D, the solid lines 701 and 711 denote one of the pair of the image signals, i.e., the A image signal, and the broken lines 702 and 712 denote the other of the pair the image signals, i.e., the B image signal. The chain doubledashed lines denote the centers of gravity of the image signals, and the dot-dash lines denote the saturation level of the image sensor 201 (the limit of the charge accumulation capacity of the photodiodes).

FIG. 7A illustrates the A image signal 701 and the B image signal 702 in a case where a point light source that is out of focus by a defocus amount D, in the focus detection region 602 is in the non-saturated state (the image signals have not reached the saturation level) with proper exposure. To simplify the description, FIG. 7B illustrates a state where the B image signal 702 is shifted by D from the state illustrated in FIG. 7A, i.e., the state of the best correlation.

FIG. 7C illustrates a case where the output of the point light source illustrated in FIG. 7A is a high luminance, and the amount of incident light to the photodiodes exceeds the saturation level. More specifically, the image signals illustrated in FIG. 7C provide, as a whole, higher signal levels than the image signals illustrated in FIG. 7A. For example, referring to FIG. 7A, the signal level of the B image signal 702 at an edge of the point light source (the vertical dotted line) is drawn by the horizontal dotted line. Referring to FIG. 7C, the corresponding signal level of the B image signal 712 provides a high signal level which coincides with the saturation level.

More specifically, FIG. 7C illustrates the A image signal 711 and the B image signal 712 in a case where a point light source that is out of focus by a defocus amount D, in the focus detection region 602 is in a saturated state and is a high luminance. Referring to FIG. 7C, in the output region exceeding the saturation level drawn by the dot-dash line, the outputs of the A image signal 711 and the B image signal 712 are clipped to the constant value at the saturation level. In this case, FIG. 7D illustrates a state where the B image signal 712 is shifted by d (D>d) from the state illustrated in FIG. 7C, i.e., the state of the best correlation.

In FIG. 7A, by signals at peaks at which a parallax-based image shift between the A and the B image signals remarkably occurs, as a result of the correlation calculation, a correct defocus amount D is calculated. By contrast, the peak cannot be detected in FIG. C (the image signals are clipped to the constant value at the saturation level) because of saturation. In this case, as a result of the correlation calculation, a defocus amount d smaller than the actual defocus amount D is misdetected.

Figure 8:
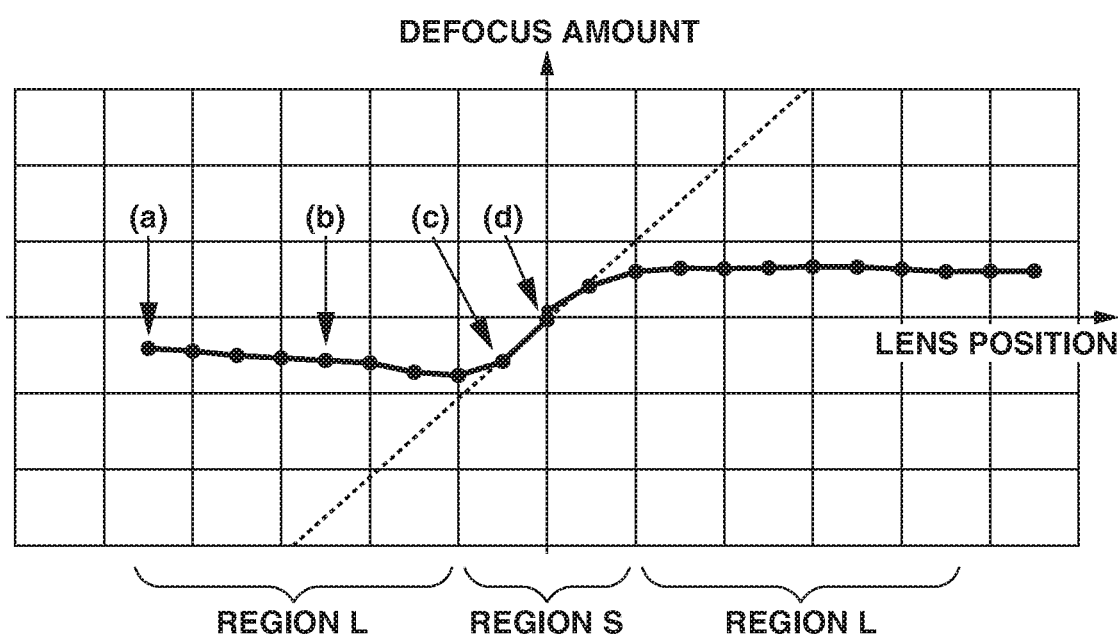
FIG. 8 is conceptual view illustrating a relation between a lens position and a defocus amount in a case where the focus detection region includes a saturated subject.

Relation Between Lens Position and Defocus Amount when Focus Detection Region Includes Saturated Subject FIG. 8 conceptually illustrates the relation between the lens position and the defocus amount in a case where the focus detection region 602 illustrated in FIG. 6 includes a saturated subject. In FIG. 8, in a region S in which the focus state is close to be in-focus state, the relation between the lens position and the defocus amount almost coincides with a linear state (drawn by the dotted line). More specifically, the reliability of the calculated defocus amount is high in the region S, and directly driving the lens causes no problem. By contrast, the image is out of focus in the regions L, the relation between the lens position and the defocus amount largely deviates from the linear state (drawn by the dotted line), i.e., the defocus amount is approximately constant regardless of the lens position.

Figure 9A:
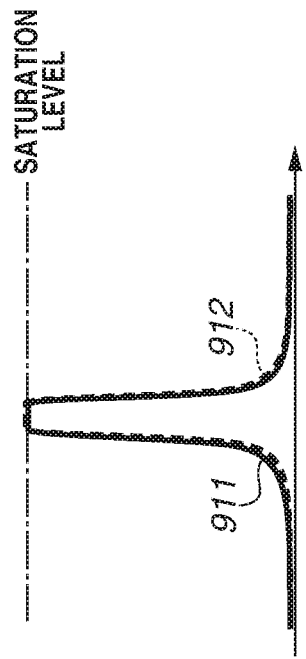
FIGS. 9A, 9B, 9C, and 9D are conceptual views illustrating AF signals (a pair of image signals) for each lens position in a case where the focus detection region includes a saturated subject.
Figure 9C:
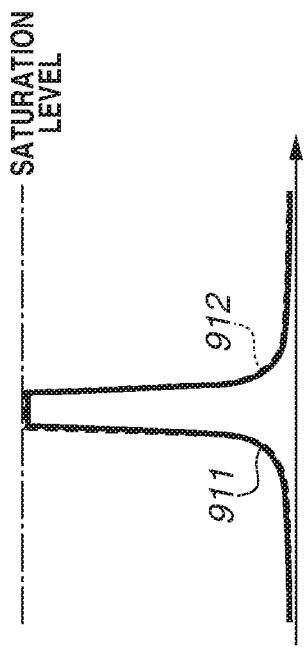
Figure 9B:
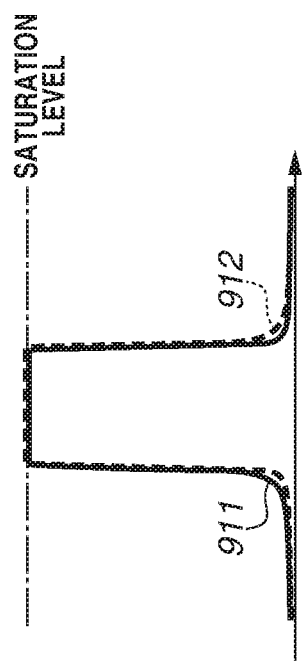
Figure 9D:
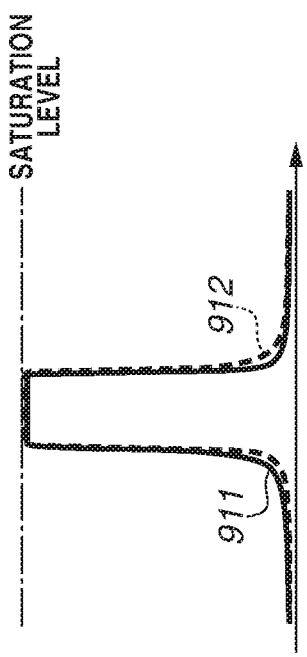

FIGS. 9A and 9B illustrate AF signals (a pair of image signals) at points (a) and (b) in a region L, respectively. FIGS. 9C and 9D illustrate the AF signals at points (c) and (d) in the region S, respectively. Referring to each of FIGS. 9A, 9B, 9C, and 9D, the solid line 911 denotes one of the pair of the image signals, i.e., the A image signal, and the broken line 912 denotes the other of the pair the image signals, i.e., the B image signal.

In defocus states illustrated in FIGS. 9A and 9B (the region L illustrated in FIG. 8), the half value widths of the A image signal 911 and the B image signal 912 increase, and the range where the output becomes constant at the saturation level increases. Thus, the influence of the portion having a constant output, on the correlation calculation becomes dominant, resulting in decreased variation in the defocus amount, as in the region L illustrated in FIG. 8.

In the area in which the focus state is close to be in-focus state illustrated in FIGS. 9C and 9D (the region S illustrated in FIG. 8), the half value widths of the A image signal 911 and the B image signal 912 decrease, and the range where the output becomes constant at the saturation level also decreases. Thus, the influence of the shift amounts of the skirts of the A image signal 911 and the B image signal 912, on the correlation calculation becomes dominant, resulting in a varying defocus amount according to the lens position, as in the region S illustrated in FIG. 8.

More specifically, in the case of a saturated subject, the influence of the portion having a constant output of the original peak portion, on the correlation calculation becomes dominant in the defocus state, resulting in decreased variation in the defocus amount.

In performing automatic focusing in the frame including a saturated subject, a defocus amount smaller than an actual out-of-focus amount is calculated. In this case, the in-focus determination criterion is to be changed or devise the driving method in consideration of small variation in the defocus amount in the defocus state.

FIGS. 7A, 7B, 7C, and 7D, 8, 9A, 9B, 9C, and 9D are schematic views. The degree of the above-described influences of the saturation on the correlation calculation varies according to the luminance, size, and shape of the saturated subject and the sensor characteristics. Further, in a general scene, the focus detection region 602 may include a high-contrast subject other than a saturated subject. In this case, the correlation of the image of the high-contrast subject may change the characteristics.

Details of Lens Drive (Step S403) According to First Exemplary Embodiment

Lens drive (step S403) according to a first exemplary embodiment of the disclosure will be described below with reference to FIG. 10. Each step illustrated in FIG. 10 is executed mainly by the system control unit 209.

In step S1001, the system control unit 209 sets the defocus amount selected in step S511 to the lens drive amount (drive amount). In step S1002, the system control unit 209 drives the lens by the drive amount set in step S1001. In step S1003, the system control unit 209 performs the focus detection processing in step S402.

In step S1004, as described above with reference to FIGS. 7A to 9D, the system control unit 209 determines whether the image to be subjected to the focus detection is a saturated subject which can be misdetected. The saturation determination will be described in detail below. In step S1005, the system control unit 209 determines whether the reliability is high with reference to the reliability calculated in step S1003 (step S508). If the reliability is low (NO in step S1005), the processing returns to step S1001. If the reliability is high (YES in step S1005), the processing proceeds to step S1006.

In step S1006, the system control unit 209 determines whether the target position determined based on the defocus amount calculated in step S1003 (step S507) is within the range of an in-focus management width. If the target position is within the range of the in-focus management width (YES in step S1006), the processing proceeds to step S1007. In step S1007, the system control unit 209 determines the focus state as the in-focus state. The processing exits this flowchart. This is because the phase difference of the image to be subjected to the focus detection becomes zero or nearly zero. For the in-focus management width, a value of ±1 Fδ or less is set because the value serves as a threshold value for determining the focus state as the in-focus state. The in-focus management width is set in the region S (close to be in-focus) illustrated in FIG. 8. In the region S, the relation between the lens position and the defocus amount is linear and has high reliability, as described above with reference to FIG. 8. Thus, the system control unit 209 determines the focus state as the in-focus state and then terminates lens drive (terminates a focusing operation).

If the target position is out of the range of the in-focus management width (NO in step S1006), the processing proceeds to step S1008. In this case, the system control unit 209 performs the focus detection again after completion of focusing lens drive.

As in the region L illustrated in FIG. 8, the defocus amount may be possibly misdetected under the influence of a saturated subject. Thus, in step S1008, the system control unit 209 determines the state of the saturated subject flag determined in step S1004. If the saturated subject flag is OFF (if the focusing detection target is not a saturated subject) (NO in step S1008), i.e., the system control unit 209 determines that the defocus amount is not misdetected, and the processing proceeds to step S1009. In step S1009, the system control unit 209 determines whether the defocus amount calculated in step S1003 (step S507) is equal to or less than a first deemed in-focus width. If the calculated defocus amount is larger than the first deemed in-focus width (NO in step S1009), the processing returns to step S1001. If the calculated defocus amount is equal to or less than the first deemed in-focus width (YES in step S1009), the processing proceeds to step S1011. In step S1011, the system control unit 209 performs the first deemed in-focus drive. The processing then exits this flowchart.

Figure 12:
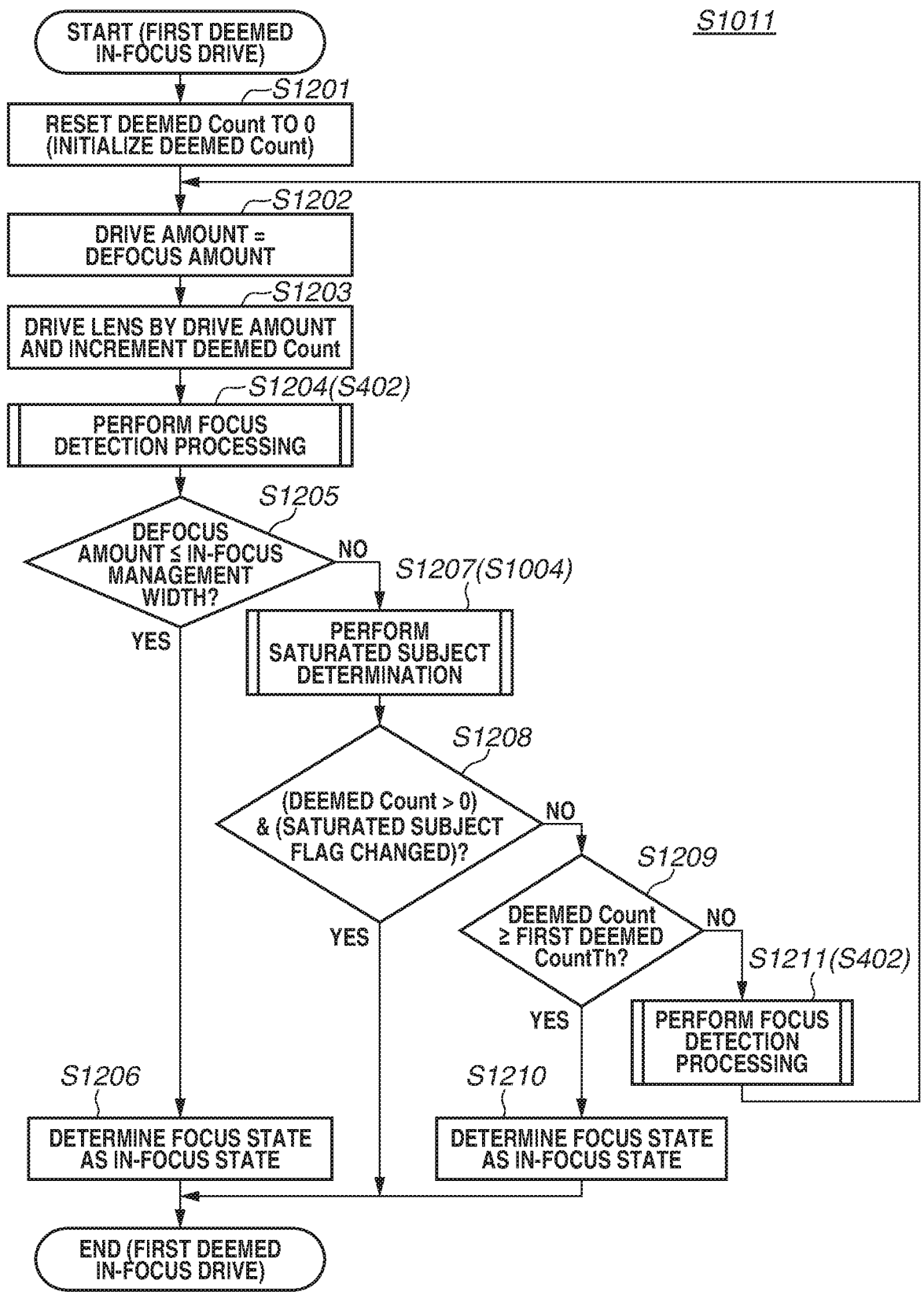
FIG. 12 is a flowchart illustrating first deemed in-focus drive.

The deemed in-focus drive which is performed in step S1011 refers to drive control processing in which the lens is driven a predetermined number of times, the focus state is determined as the in-focus state, and forcibly terminating lens drive is forcibly terminated (described below with reference to FIG. 12). The deemed in-focus drive is a general technique for addressing such a trouble that the in-focus state cannot be obtained while the subject is moving during one-shot AF and a trouble that the in-focus state can be hardly obtained because of the degraded lens drive accuracy due to degradation over time. The deemed in-focus drive will be described in detail below.

As described above, the deemed in-focus drive in step S1011 forcibly terminates lens drive. Thus, to start the deemed in-focus drive, the reliability of the focus detection is high (step S1005) and that the lens exists in a region in which in-focus state is obtained to a certain extent. Thus, the first deemed in-focus width for determining whether to start the deemed in-focus drive is set to a value of about ±5 Fδ.

If the saturated subject flag is ON (if the focusing detection target is a saturated subject) (YES in step S1008), the possibility that the defocus amount is misdetected is high, and the processing proceeds to S1010. In step S1010, the system control unit 209 determines whether the defocus amount calculated in step S1003 (S507) is equal to or less than a second deemed in-focus width. if the focusing detection target is a saturated subject, a defocus amount smaller than the actual out-of-focus amount is detected in error and tends not to vary, as described above with reference to FIGS. 7A, 7B, 7C, 7D, 8, 9A, 9B, 9C, and 9D. Thus, the second deemed in-focus width is set to a value smaller than the first deemed in-focus width.

More specifically, in a case where the focusing detection target is a saturated subject, to avoid defocusing, starting the deemed in-focus drive in the region L illustrated in FIG. 8 is to be avoided. Thus, the second deemed in-focus width is to be set to a value smaller than the defocus amount which is misdetected in the region L. Accordingly, the second deemed in-focus width to a value of about ±2 Fδ is set. If the calculated defocus amount is larger than the second deemed in-focus width (NO in step S1010), the processing returns to step S1001. If the calculated defocus amount is equal to or less than the second deemed in-focus width (YES in step S1010), the processing proceeds to step S1011. In step S1011, the system control unit 209 performs the first deemed in-focus drive. Then, the processing exits this flowchart.

According to the present exemplary embodiment, the relation between the deemed in-focus width |A|, the first deemed in-focus width |B|, and the second deemed in-focus width |C| is as follows:

$$|A| < |C| < |B| \tag{1}$$

In a case where a saturated subject is detected, the threshold value for starting the deemed in-focus drive is set to a value smaller than that in a usual case (when no saturated subject is detected) in consideration of the misdetection of a defocus amount smaller than the actual out-of-focus amount. This prevents the in-focus determination in the defocus state.

The saturated subject determination (step S1004) will be described below with reference to FIG. 11.

In step S1101, the system control unit 209 determines whether a variation in the defocus amount (defocus variation) is equal to or less than a predetermined threshold value (saturated subject ΔdefocusTh). The defocus variation is a difference between the defocus amount selected in step S511 and the last defocus amount. The saturated subject ΔdefocusTh is a threshold value determined by the amount of the back-and-forth movement of lens driven in step S1002 or the moving amount of the image plane, based on the defocus amount selected in step S511. More specifically, the system control unit 209 determines whether the defocus amount varies based on the variation in the defocus amount calculated in step S511 with respect to the variation in the defocus amount expected from the lens drive amount or the moving amount of the image plane.

If the system control unit 209 determines that the defocus variation is larger than the predetermined threshold value, ΔdefocusTh, (there is a variation in defocus amount) (NO in step S1101), the processing proceeds to step S1105. In step S1105, the system control unit 209 sets the saturated subject flag to OFF. Then, the processing exits this flowchart. If the system control unit 209 determines that the defocus variation is equal to or less than the predetermined threshold value, ΔdefocusTh, (there is no variation in defocus amount) (YES in step S1101), the processing proceeds to step S1102. In step S1102, the system control unit 209 increments saturated subject Count.

In step S1103, the system control unit 209 determines whether saturated subject Count is equal to or larger than a predetermined threshold value (saturated subject CountTh), and detects the saturated subject. More specifically, the system control unit 209 determines whether a state in which the defocus variation is equal to or less than the predetermined threshold value ΔdefocusTh (there is no defocus variation) has continuously occurred the predetermined number of times. This determination is made to prevent misdetection that there is no defocus variation due to a variation in the correlation calculation, and misdetection that occurs when the lens drive response is poor. Thus, saturated subject Count is set to a value of 2 or more. While the number of times is used for the threshold value, a time duration (time period) may be used for the threshold value (predetermined time duration) to prevent misdetection. If subject Count is equal to or larger than the threshold value (saturated subject CountTh), i.e., when a saturated subject is detected (YES in step S1103), the processing proceeds to step S1104. In step S1104, the system control unit 209 sets the saturated subject flag to ON. The processing then exits this flowchart. If saturated subject Count is smaller than the threshold value (saturated subject CountTh) (NO in step S1103), the processing proceeds to step S1105. In step S1105, the system control unit 209 sets the saturated subject flag to OFF. The processing then exits this flowchart.

In this flowchart, the system control unit 209 detects a saturated subject depending only on whether the defocus amount has changed. However, additional steps may be included in this flowchart. Examples of additional steps include a step for determining a saturated subject only in a case where the number of pixels saturated in pixel units is determined to be equal to or larger than a threshold value, and a step for determining whether the defocus amount is within a predetermined range in consideration of the misdetection of the defocus amount as a value smaller than the actual out-of-focus amount. This enables a saturated subject to be detected with favorable accuracy.

The deemed in-focus drive (step S1011) will be described below with reference to FIG. 12.

In step S1201, the system control unit 209 initializes the number of deemed in-focus drives (hereinafter referred to as deemed Count). In step S1202, the system control unit 209 sets the defocus amount calculated in the focus detection processing in step S1003 to the lens drive amount (drive amount). In step S1203, the system control unit 209 drives the lens by the drive amount set in step S1001 and then increments deemed count.

In step S1204, the system control unit 209 starts the flowchart of the focus detection processing (step S402) and calculates the defocus amount. In step S1205, the system control unit 209 determines whether the defocus amount calculated in step S1204 is equal to or less than the in-focus management width. If the calculated defocus amount is equal to or less than the in-focus management width (YES in step S1205), the processing proceeds to step S1206. In step S1206, the system control unit 209 determines the focus state as the in-focus state. The processing then exits this flowchart. If the calculated defocus amount is larger than the in-focus management width (NO in step S1205), the processing proceeds to step S1207. In step S1207, the system control unit 209 starts the flowchart of the saturated subject determination (step S1004).

In step S1208, if deemed Count is not zero, the system control unit 209 checks the result of the saturated subject determination. If the state of the saturated subject flag has been changed (YES in step S1208), the processing exits this flowchart. If deemed Count is zero, or if deemed Count is not zero and the state of the saturated subject flag remains unchanged (NO in step S1208), the processing proceeds to step S1209.

In step S1209, the system control unit 209 determines whether deemed Count is equal to or larger than the first deemed CountTh. If deemed Count is equal to or larger than the first deemed CountTh (YES in step S1209), the processing proceeds to step S1210. In step S1210, the system control unit 209 determines the focus state as the in-focus state. The processing then exits this flowchart. If deemed Count is less than the first deemed CountTh (NO in step S1209), the processing proceeds to step S1211. In step S1211, the system control unit 209 starts the flowchart of the focus detection processing (step S402). The processing then returns to step S1202. If the reliability decreases in step S1211, the system control unit 209 determines the focus state as the defocus state. The processing then exits this flowchart (not illustrated).

Figure 13:
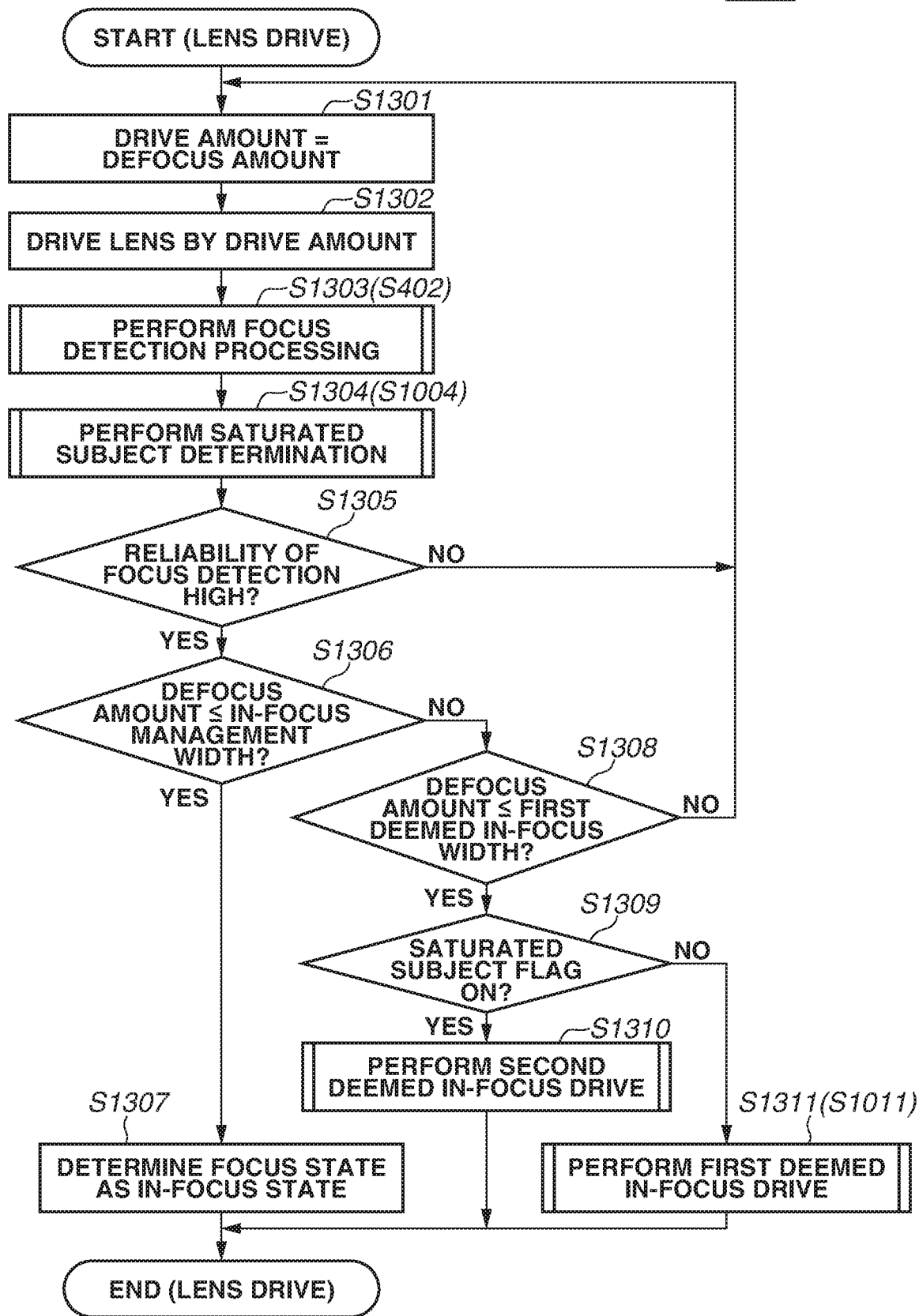
FIG. 13 is a flowchart illustrating lens drive.

A method for preventing defocus by changing the deemed in-focus width has been described above. Another method for preventing defocus by changing the number of deemed in-focus drives will be described below with reference to FIGS. 13 and 14. The operations in steps S1301 to S1307 illustrated in FIG. 13 are similar to those in steps S1001 to S1007 illustrated in FIG. 10, and redundant descriptions thereof will be omitted.

If the defocus amount is larger than the in-focus management width (NO in step S1306), the processing proceeds to step S1308. In step S1308, the system control unit 209 determines whether the defocus amount is equal to or less than the first deemed in-focus width. In step S1309, the system control unit 209 determines the ON/OFF state of the saturated subject flag determined in step S1304. If the saturated subject flag is OFF (NO in step S1309), the processing proceeds to step S1311 (step S1011). In step S1311, the system control unit 209 starts the first deemed in-focus drive. The processing exits this flowchart. If the saturated subject flag is ON (YES in step S1309), the processing proceeds to step S1310. In step S1310, the system control unit 209 starts a second deemed in-focus drive illustrated in FIG. 14. The processing then exits this flowchart.

Figure 14:
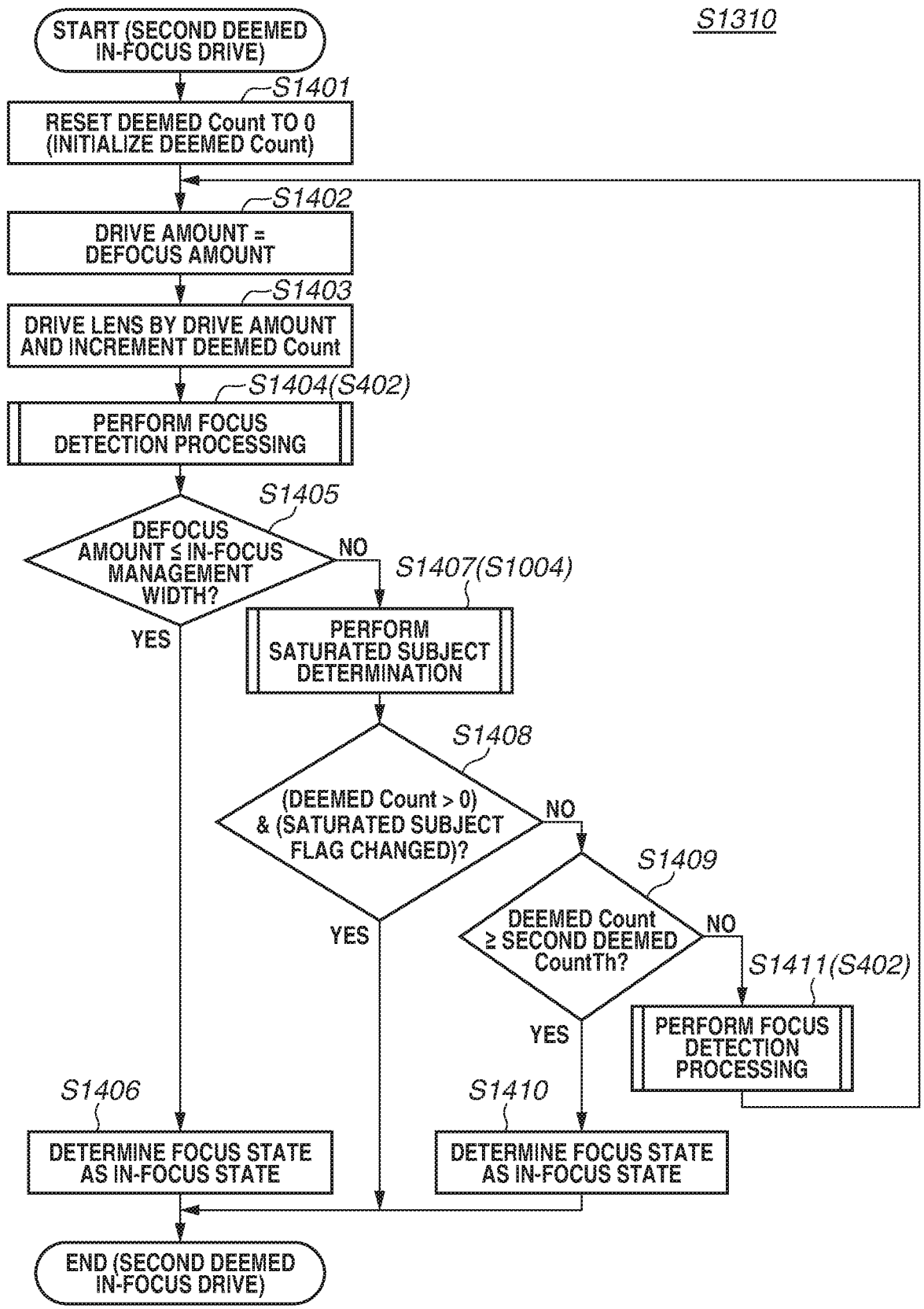
FIG. 14 is a flowchart illustrating second deemed in-focus drive.

The second deemed in-focus drive illustrated in FIG. 14 differs from the first deemed in-focus drive (step S1011) only in threshold value of deemed Count in step S1409, i.e., second deemed CountTh larger than first deemed CountTh is set. More specifically, the number of deemed in-focus drives which is performed for a case where a saturated subject is detected is larger than the number of deemed in-focus drives which is performed for a case where no saturated subject is detected.

Thus, even in a case where lens drive is insufficient and cannot be driven to achieve focus with the first deemed CountTh, lens drive can be continued with second deemed CountTh, resulting in an improved focusing rate.

In this way, the focusing rate can be improved by increasing the number of deemed in-focus drives and the time duration thereof in a case where a saturated subject is detected. This effect can also be obtained by removing (canceling) the limitations including the limited number of deemed in-focus drives and the limited time duration thereof.

To simplify the descriptions, a case where only one focus detection region (AF region) is set, has been described above with reference to FIG. 6. However, the effect of the present exemplary embodiment can also be obtained even in a case where the correlation calculation is performed for a plurality of AF regions, and a region to be subjected to automatic focusing is automatically selected based on the result of the correlation calculations.

As described above, the present exemplary embodiment makes it possible to improve the focusing rate in an image including a high-luminance subject, by detecting a misdetected saturated subject and then suitably changing the determination criterion before terminating lens drive.

Details of Lens Drive (Step S403) According to Second Exemplary Embodiment

Figure 15:
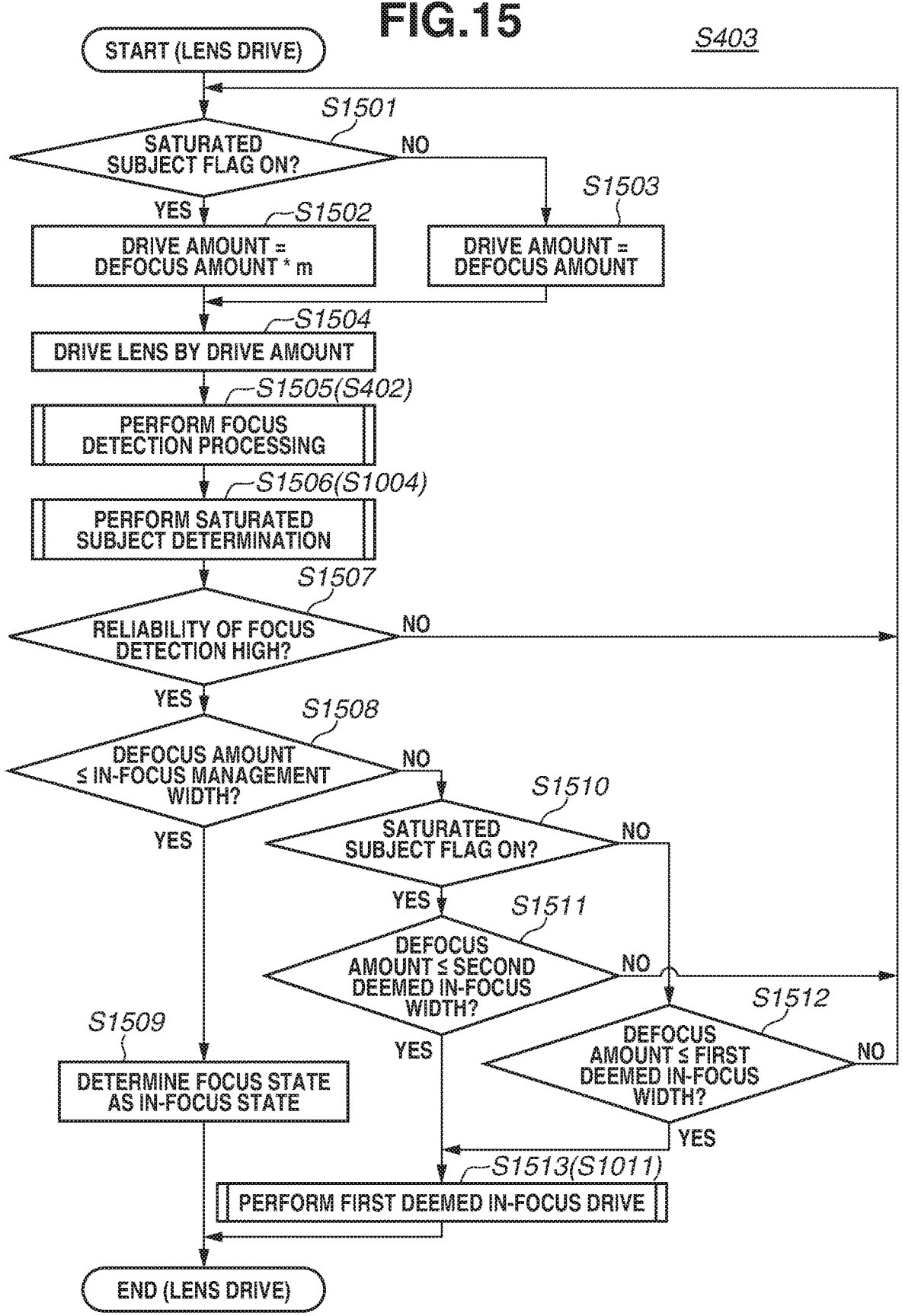
FIG. 15 is a flowchart illustrating lens drive according to a second exemplary embodiment.

Lens drive (step S403) according to a second exemplary embodiment of the disclosure will be described below with reference to FIG. 15. For components of an imaging apparatus 10 according to the second exemplary embodiment equivalent to those of the imaging apparatus 10 (the lens-interchangeable camera system 10) according to the above-described first exemplary embodiment, redundant descriptions will be omitted.

In step S1501, the system control unit 209 determines the ON/OFF state of the saturated subject flag. If the saturated subject flag is OFF (NO in step S1501), the processing proceeds to step S1503. In step S1503, the system control unit 209 sets the defocus amount selected in step S511 to the lens drive amount (drive amount). If the saturated subject flag is ON (YES in step S1501), the processing proceeds to step S1502. In step S1502, the system control unit 209 multiplies the defocus amount selected in step S511 by m (>1) and sets the product to the lens drive amount (drive amount). In step S1504, the system control unit 209 drives the lens by the drive amount set in step S1001.

In this way, in a case where a saturated subject is detected, driving the lens by a defocus amount larger than the defocus amount calculated through the correlation calculation enables a quick exit from the defocus state with small (no) variation in the defocus amount, and thus quickly obtaining the in-focus state. Although, in the present exemplary embodiment, the system control unit 209 sets the defocus amount multiplied by m to the drive amount, the effect of the present exemplary embodiment can be obtained by setting a predetermined value, for example, 10 Fδ.

As described above, the present exemplary embodiment makes it possible to improve the focusing rate in an image including a high-luminance subject, by detecting a misdetected saturated subject and then suitably changing the lens driving method.

Details of Lens Drive (Step S403) According to Third Exemplary Embodiment

Figure 16:
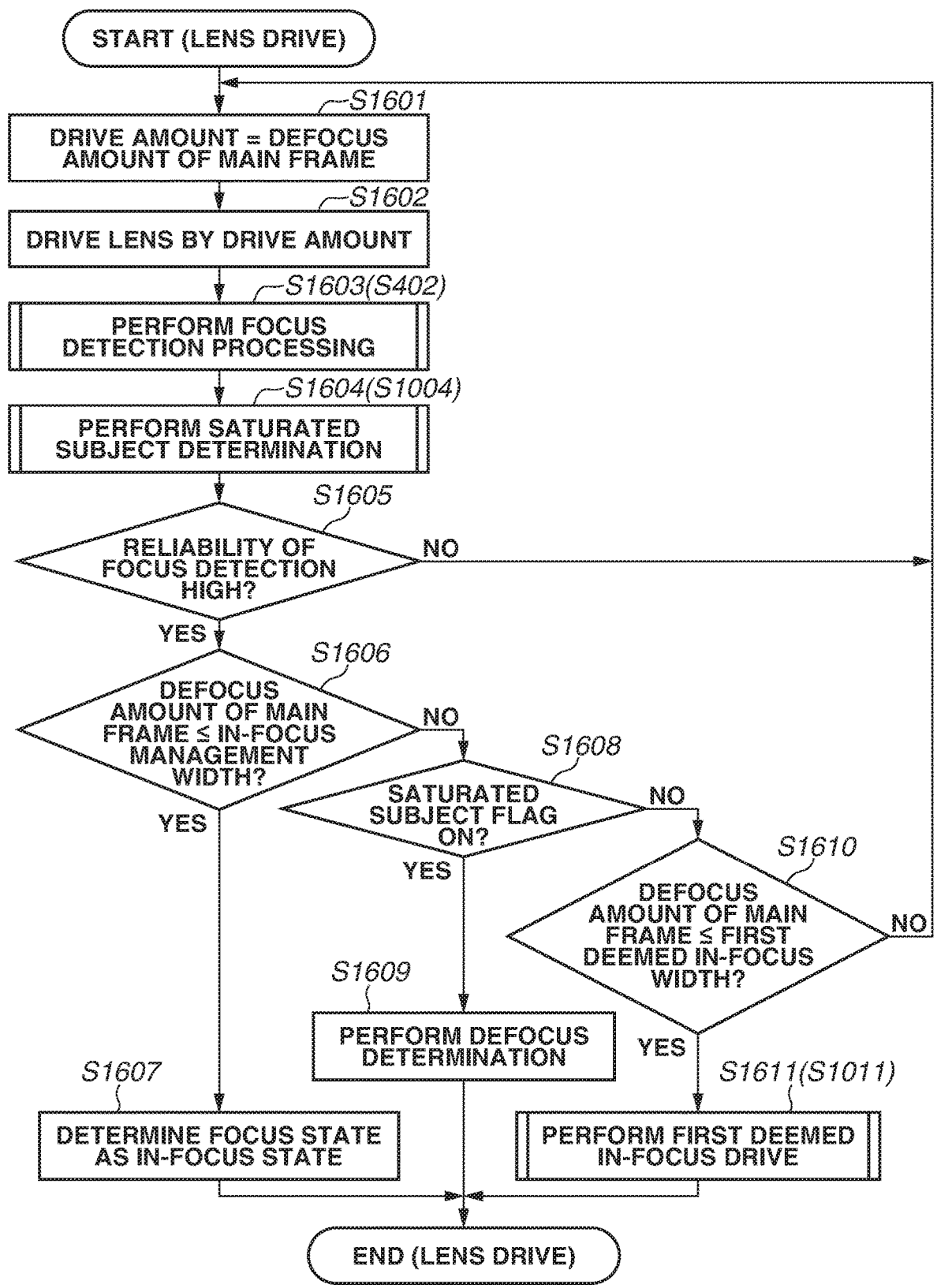
FIG. 16 is a flowchart illustrating lens drive according to a third exemplary embodiment.

Lens drive (step S403) according to a third exemplary embodiment of the disclosure will be described below with reference to FIG. 16. For components of an imaging apparatus 10 according to the third exemplary embodiment equivalent to those of the imaging apparatus 10 according to the above-described first exemplary embodiment, redundant descriptions will be omitted. Operations in steps S1601 to S1607 illustrated in FIG. 16 are similar to those in steps S1001 to S1007 illustrated in FIG. 10, and redundant descriptions thereof will be omitted.

If the defocus amount is larger than the in-focus management width (NO in step S1606), the processing proceeds to step S1608. In step S1608, the system control unit 209 determines the ON/OFF state of the saturated subject flag. If the saturated subject flag is OFF (NO in step S1608), the processing proceeds to step S1610. In step S1610, the system control unit 209 determines whether the defocus amount is equal to or less than the first deemed in-focus width. If the defocus amount is larger than the first deemed in-focus width (NO in step S1610), the processing returns to step S1601. If the defocus amount is equal to or less than the first deemed in-focus width (YES in step S1610), the processing proceeds to step S1611. In step S1611, the system control unit 209 starts the first deemed in-focus drive. The processing then exits this flowchart. If the saturated subject flag is ON (YES in step S1608), the processing proceeds to step S1609. In step S1609, the system control unit 209 determines the focus state as the defocus state. The processing then exits this flowchart.

In a case where a saturated subject is detected in a state where the defocus amount does not reach the in-focus management width (in the defocus state), as described above, the system control unit 209 determines the focus state as the defocus state. This enables avoiding an error that the focus state is determined as the focus state in the defocus state.

In one embodiment, the imaging apparatus 10 includes a notification unit for issuing a notification to the user when a saturated subject is detected in a state where the defocus amount does not reach the in-focus management width (in the defocus state). More specifically, in step S405, the notification unit changes the color of a defocus frame, flashes the frame, or separately displays a saturated subject flag icon. The notification unit issues a notification that the defocus state results due to the saturated subject flag. More specifically, the notification unit notifies the user that keeping pressing the switch SW1 again enable the in-focus state to be obtained or that manually moving the lens to an extent to obtain a state in which the focus state is close to in-focus state and performing automatic focusing enable the user to obtain the in-focus state.

The system control unit 209 may record a captured image in a recording medium in association with attribute information indicating a "saturated subject". This enables an icon indicating a saturated subject to be displayed also in reproducing the captured image, allowing the user to easily identify a captured image of the saturated subject.

As described above, the present exemplary embodiment makes it possible to improve the focusing rate in an image including a high-luminance subject, by detecting a misdetected saturated subject and then suitably changing the determination criterion before terminating lens drive.

As described above, the present exemplary embodiments make it possible to improve the focusing accuracy in an image including a high-luminance subject, by detecting a misdetected saturated subject and then suitably changing the determination criterion before terminating lens drive and the lens driving method.

Accordingly, the focusing accuracy is prevented from degrading even in performing a focusing operation on a saturated subject as a main subject.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-086265, filed Apr. 26, 2019, which is hereby incorporated by reference herein in its entirety.

What is claimed is:

1. An apparatus comprising:
one or more processors; and
memory storing instructions that, when executed by the one or more processors, cause the apparatus to perform operations including:
performing control to,
terminate, in a case where a detected defocus amount is within a range of a first in-focus management width, a focusing adjustment operation without moving a focusing lens,
move, in a case where the defocus amount is out of the range of the first in-focus management width, the focusing lens to perform the focusing adjustment operation,
move, in a case where the defocus amount is within a range of a second in-focus management width, the focusing lens and then terminate the focusing adjustment operation without performing focus detection processing again, and
move, in a case where the defocus amount is out of the range of the second in-focus management width, the focusing lens to perform the focus detection processing again; and
changing, in a case where a subject to be subjected to the focus detection processing is a saturated subject, at least one of the range of the second in-focus management width and the focusing adjustment operation.

2. An apparatus comprising:
one or more processors; and
memory storing instructions that, when executed by the one or more processors, cause the apparatus to perform operations including:
detecting a defocus amount of an image of a target subject to be subjected to focus detection processing based on a signal output from an image sensor that photoelectrically converts a light flux incident through an imaging optical system including a focusing lens and outputs a signal;
performing focus control for controlling a first lens movement as a movement of the focusing lens, the first lens movement aiming at a target position at which the defocus amount falls within a range of a first in-focus management width, the focus control being performed to,
terminate controlling lens movement of the focusing lens in a case where the focusing lens has reached the range of the first in-focus management width,
repeat, in a case where the focusing lens has not reached the range of the first in-focus management width, the first lens movement if the focusing lens has reached a range of a second in-focus management width for determining whether to repeat the first lens movement, and
terminate, in a case where at least one of the number of times or a time duration of the first lens movement has reached a limit on the number of times or a limit on the time duration, respectively, controlling lens movement even if the focusing lens has not reached the range of the first in-focus management width for the first lens movement; and
determining, as saturation determination, whether the target subject to be subjected to the focus detection processing is a saturated subject,
wherein, in a case where the target subject is determined to be a saturated subject in the saturation determination, the range of the second in-focus management width as a determination criterion before the focusing lens reaches a movement end is changed in the focus control.

3. The apparatus according to claim 2, wherein, in a case where the target subject is the saturated subject in the saturation determination, the range of the second in-focus management width as a determination criterion for determining that the focusing lens has reached the range of the second in-focus management width for the first lens movement is differentiated in the focus control from the range of the second in-focus management width in a case where the target subject is not the saturated subject.

4. The apparatus according to claim 2, wherein, in a case where the target subject is the saturated subject in the saturation determination, the range of the second in-focus management width as the determination criterion for determining that the focusing lens has reached the range of the second in-focus management width for the first lens movement is narrowed in the focus control compared with the range of the second in-focus management width in a case where the target subject is not the saturated subject.

5. The apparatus according to claim 2, wherein, in a case where the target subject is the saturated subject in the saturation determination, the limit on the number of times or the limit on the time duration for repeating the first lens movement is differentiated from the limit in a case where the target subject is not the saturated subject, the limit being a determination criteria for determining whether to terminate the first lens movement.

6. The apparatus according to claim 2, wherein, in a case where the target subject is the saturated subject in the saturation determination, the limit on the number of times or the limit on the time duration for repeating the first lens movement are canceled or increased compared with a case where the target subject is not the saturated subject, the limit being a determination criteria for determining whether to terminate the first lens movement.

7. An apparatus comprising:
one or more processors; and
memory storing instructions that, when executed by the one or more processors, cause the apparatus to perform operations including:
detecting a defocus amount of an image of a target subject to be subjected to focus detection processing based on a signal output from an image sensor that photoelectrically converts a light flux incident through an imaging optical system including a focusing lens and outputs a signal;
performing focus control for controlling a first lens movement as a movement of the focusing lens, the first lens movement aiming at a target position at which the defocus amount falls within a range of a first in-focus management width, the focus control being performed to
terminate controlling the first lens movement of the focusing lens in a case where the focusing lens has reached the range of the first in-focus management width,
repeat the first lens movement in a case where the focusing lens has not reached the range of the first in-focus management width and where the focusing lens has reached a range of a second in-focus management width for determining whether to repeat the first lens movement, and
forcibly terminate, in a case where at least one of the number of times or a time duration of the first lens movement has reached a limit on the number of times or a limit on the time duration, respectively, controlling lens movement even if the focusing lens has not reached the range of the first in-focus management width for the first lens movement; and
determining, as saturation determination, whether the target subject to be subjected to the focus detection processing is a saturated subject,
wherein, in a case where the target subject is determined to be a saturated subject in the saturation determination, control of the movement of the focusing lens before the focusing lens reaches a movement end is changed in the focus control.

8. The apparatus according to claim 7, wherein, in a case where the target subject is the saturated subject in the saturation determination, control of the movement of the focusing lens is changed in the focus control so that a second lens movement in which the focusing lens is more largely moved than in the first lens movement is performed.

9. An apparatus comprising:
one or more processors; and
memory storing instructions that, when executed by the one or more processors, cause the focusing adjustment apparatus to perform operations including:
detecting a defocus amount of an image of a target subject to be subjected to focus detection processing based on a signal output from an image sensor that photoelectrically converts a light flux incident through an imaging optical system including a focusing lens and outputs a signal;
performing focus control for controlling a first lens movement as a movement of the focusing lens, the first lens movement aiming at a target position at which the defocus amount falls within a range of a first in-focus management width, the focus control being performed to, terminate controlling lens movement of the focusing lens in a case where the focusing lens has reached the range of the first in-focus management width,
repeat, in a case where the focusing lens has not reached the range of the first in-focus management width, the first lens movement if the focusing lens has reached a range of a second in-focus management width for determining whether to repeat the first lens movement, and
terminate, in a case where at least one of the number of times or a time duration of the first lens movement has reached a limit on the number of times or a limit on the time duration, respectively, controlling lens movement even if the focusing lens has not reached the range of the first in-focus management width for the first lens movement; and
determining whether the target subject to be subjected to the focus detection processing is a saturated subject,
wherein, in a case where the target subject is the saturated subject in the saturation determination, in the focus control, the first lens movement is terminated, a focus state is determined as a defocus state, and the movement of the focusing lens is terminated.

10. The apparatus according to claim 9, wherein, the apparatus is further caused to perform issuing a notification to a user in a case where the target subject is the saturated subject in the saturation determination, and where the first lens movement is terminated, a focus state is determined as the defocus state, and then the movement of the focusing lens is terminated.

11. The apparatus according to claim 2, wherein the image sensor includes a plurality of pixels that photoelectrically converts light fluxes that have passed different pupil regions of the imaging optical system and outputs a pair of signals for focus detection.

12. The apparatus according to claim 2, wherein the image sensor includes a plurality of two-dimensionally arranged micro lenses each of which having a plurality of photoelectric conversion elements.

13. An imaging apparatus comprising:
an image sensor; and
the apparatus according to claim 2.

14. A method for controlling an apparatus for performing control to:
terminate, in a case where a detected defocus amount is within a range of a first in-focus management width, a focusing adjustment operation without moving a focusing lens;
move, in a case where the defocus amount is out of the range of the first in-focus management width, the focusing lens to perform the focusing adjustment operation;
move, in a case where the defocus amount is within a range of a second in-focus management width, the focusing lens and then terminate the focusing adjustment operation without performing focus detection processing again; and
move, in a case where the defocus amount is out of the range of the second in-focus management width, the focusing lens to perform the focus detection processing again,
wherein, in a case where a subject to be subjected to the focus detection processing is a saturated subject, at least one of the range of the second in-focus management width and the focus detection operation is changed.

15. A method for controlling an apparatus, the method comprising:
  detecting, as focus detection, a defocus amount of an image of a target subject to be subjected to focus detection processing based on a signal output from an image sensor that photoelectrically converts a light flux incident through an imaging optical system including a focusing lens and outputs a signal;
  performing focus control for controlling a first lens movement as a movement of the focusing lens, the first lens movement aiming at a target position at which the defocus amount falls within a range of a first in-focus management width, the focus control being performed to,
  terminate controlling lens movement of the focusing lens in a case where the focusing lens has reached the range of the first in-focus management width,
  repeat, in a case where the focusing lens has not reached the range of the first in-focus management width, the first lens movement if the focusing lens has reached a range of a second in-focus management width for determining whether to repeat the first lens movement, and
  terminate, in a case where at least one of the number of times or a time duration of the first lens movement has reached a limit on the number of times or a limit on the time duration, respectively, controlling lens movement even if the focusing lens has not reached the range of the first in-focus management width for the first lens movement; and
  determining, as saturation determination, whether the target subject to be subjected to the focus detection processing is a saturated subject,
  wherein, in a case where the target subject is the saturated subject in the saturation determination, the range of the second in-focus management width as a determination criterion before the focusing lens reaches a movement end is changed in the focus control.

16. A method for controlling an apparatus, the method comprising:
  detecting, as focus detection, a defocus amount of an image of a target subject to be subjected to focus detection processing based on a signal output from an image sensor that photoelectrically converts a light flux incident through an imaging optical system including a focusing lens and outputs a signal;
  performing focus control for controlling a first lens movement as a movement of the focusing lens, the first lens movement aiming at a target position at which the defocus amount falls within a range of a first in-focus management width, the focus control being performed to,
  terminate controlling lens movement in a case where the focusing lens has reached the range of the first in-focus management width during the first lens movement,
  repeat, in a case where the focusing lens has not reached the range of the first in-focus management width, the first lens movement if the focusing lens has reached a range of a second in-focus management width for determining whether to repeat the first lens movement, and
  terminate, in a case where at least one of the number of times or a time duration of the first lens movement has reached a limit on the number of times or a limit on the time duration, respectively, controlling lens movement even if the focusing lens has not reached the range of the first in-focus management width for the first lens movement; and
  determining, as saturation determination, whether the target subject to be subjected to the focus detection processing is a saturated subject,
  wherein, in a case where the target subject is a saturated subject in the saturation determination, the focus control terminates the first lens movement, and then determines a focus state as defocus state and terminates the movement of the focusing lens.

17. A method for controlling an apparatus, the method comprising:
  detecting, as focus detection, a defocus amount of an image of a target subject to be subjected to focus detection processing based on a signal output from an imaging unit that photoelectrically converts a light flux incident through an imaging optical system including a focusing lens and outputs a signal;
  performing focus control for controlling a first lens movement as a movement of the focusing lens, the first lens movement aiming at a target position at which the defocus amount falls within a range of a first in-focus management width, the focus control being performed to,
  terminate controlling lens movement of the focusing lens in a case where the focusing lens has reached the range of the first in-focus management width,
  repeat, in a case where the focusing lens has not reached the range of the first in-focus management width, the first lens movement if the focusing lens has reached a range of a second in-focus management width for determining whether to repeat the first lens movement, and
  terminate, in a case where at least one of the number of times or a time duration of the first lens movement has reached a limit on the number of times or a limit on the time duration, respectively, controlling lens movement even if the focusing lens has not reached the range of the first in-focus management width for the first lens movement; and
  determining, as saturation determination, whether the target subject to be subjected to the focus detection processing is a saturated subject,
  wherein, in a case where the target subject is the saturated subject in the saturation determination, the focus control terminates the first lens movement, and then determines a focus state as defocus state and terminates the movement of the focusing lens.

* * * * *